US011150223B2

United States Patent
Magni et al.

(10) Patent No.: US 11,150,223 B2
(45) Date of Patent: Oct. 19, 2021

(54) SAMPLING METHOD FOR THE CHROMATOGRAPHIC ANALYSIS OF THE HEADSPACE

(71) Applicant: THERMO FISHER SCIENTIFIC SPA, Rodano (IT)

(72) Inventors: Paolo Magni, Rodano (IT); Stefano Pelagatti, Rodano (IT); Riccardo Facchetti, Rodano (IT); Antonio Scaglione, Rodano (IT)

(73) Assignee: THERMO FISHER SCIENTIFIC SPA, Rodano (IT)

( * ) Notice: Subject to any disclaimer, the term of this patent is extended or adjusted under 35 U.S.C. 154(b) by 190 days.

(21) Appl. No.: 15/921,151

(22) Filed: Mar. 14, 2018

(65) Prior Publication Data

US 2018/0284076 A1    Oct. 4, 2018

(30) Foreign Application Priority Data

Mar. 29, 2017    (IT) .................. 102017000034608

(51) Int. Cl.
*G01N 30/20* (2006.01)
*G01N 1/22* (2006.01)
*G01N 30/18* (2006.01)
*G01N 30/02* (2006.01)

(52) U.S. Cl.
CPC .......... *G01N 30/20* (2013.01); *G01N 1/2226* (2013.01); *G01N 30/18* (2013.01); *G01N 2001/2229* (2013.01); *G01N 2030/025* (2013.01); *G01N 2030/202* (2013.01); *G01N 2030/207* (2013.01)

(58) Field of Classification Search
CPC ......... G01N 1/2226; G01N 2001/2229; G01N 2001/2238; G01N 2030/025; G01N 30/20; G01N 2030/202
USPC .................... 73/23.4, 23.41, 23.42
See application file for complete search history.

(56) References Cited

U.S. PATENT DOCUMENTS

| 5,932,482 | A | 8/1999 | Markelov |
| 2002/0006360 | A1* | 1/2002 | Neal ................. G01N 35/1097 422/501 |
| 2005/0210957 | A1* | 9/2005 | Tipler ................ G01N 15/0826 73/37 |
| 2005/0279408 | A1 | 12/2005 | Henderson et al. |

(Continued)

FOREIGN PATENT DOCUMENTS

EP    2876438    5/2015

OTHER PUBLICATIONS

Search Report and written opinion dated Dec. 5, 2017 for Italian Priority application No. 102017000034608.

*Primary Examiner* — Benjamin R Schmitt (57) ABSTRACT

The invention concerns a method for preparing a sample to be introduced in a chromatographic analysis system from the headspace of a vial, by introducing a pressurized inert gas in said headspace, controlling the pressure or flow, and subsequently by discharging said pressure from the headspace through a loop having constant volume and through a discharge duct provided with a valve, the discharge duct branching with respect to the feed duct. To eliminate the drawbacks of the known methods, during the step of discharging the pressure, the feed duct is kept open and the pressure in said loop is controlled by detecting the feed and/or discharge pressure.

9 Claims, 6 Drawing Sheets

(56) References Cited

U.S. PATENT DOCUMENTS

2012/0103063 A1   5/2012  Bushey et al.
2012/0186331 A1*  7/2012  Tipler .................. G01N 1/2226
                                                73/23.41

* cited by examiner

SAMPLING METHOD FOR THE CHROMATOGRAPHIC ANALYSIS OF THE HEADSPACE

RELATED APPLICATION

This application claims priority to Italian patent application No. 102017000034608 filed on Mar. 29, 2017, the contents of which are hereby incorporated by reference, as if set forth in their entirety.

TECHNICAL FIELD

The present invention concerns a method for preparing a sample to be introduced in a chromatographic analysis system, in particular gas-chromatographic analysis, such sample being obtained from the headspace of a vial or container wherein the sample is housed.

BACKGROUND

One of the conventional techniques essentially consists in pressurizing said headspace, i.e. the space that has been provided above the solid or liquid sample, in the hermetically sealed vial, for example by a needle penetrating through a closing septum of the vial itself. The needle is fed with an inert gas by a feed duct in which a proportional valve, which is subjected to a pressure detector, is operating to control the pressure in said headspace. Still according to this conventional technique, once the pressurizing of the headspace has been completed, the feed duct is closed and a discharge duct, connected to the vial and to a loop or a chamber having a constant volume in which a predetermined amount of gaseous sample is accumulated, is opened. At the end of the discharge period the loop is connected, by a known 6-way valve, with a source of carrier gas and the gas chromatographic column, in order to make the analysis.

The pressure in the discharge duct, and thus in the loop, is controlled by a proportional valve driven by a pressure detector installed in the discharge duct or else, in a less sophisticated way, by an on/off valve and a calibrated flow limiter, still on the discharge duct.

This traditional technique has a series of problems and imperfections that the present invention intends to eliminate.

A first problem arises by the fact that the amount of sample remaining in the loop depends upon the absolute pressure inside it. If the pressure is the atmospheric pressure, a variation of the latter can affect the amount of sample used for the analysis and thus the repetitiveness of such analysis. In order to make the analytical result independent from the atmospheric pressure, often a residual pressure is left in the loop. Among the two above mentioned systems to control the residual pressure in the loop, the second one is clearly an approximate and insufficient system, whereas the first one requires the use of a delicate proportional valve that can be damaged or also only polluted by the sample crossing it. Moreover, if it has been verified that the pressure in the loop falls below the desired value, it is not possible restoring the latter. Another problem arises by the fact that, during the discharge, the part of sample exceeding the volume of the loop, when reaches the colder area of the discharge path, where the discharge valve is placed, it can condense (especially the solvent in the liquid samples) thus causing the malfunctioning and/or damaging of the valve itself. To avoid this drawback it has been proposed to add a filter on the discharge duct, upstream of the valve, however adding an undesired volume on the line. As an alternative it could be possible to heat the discharge area, but this involves major costs and a special valve resistant to high temperatures.

SUMMARY

The present invention allows eliminating or at least reducing the problems mentioned above. It essentially relates to a method for preparing a sample to be introduced in a chromatographic analysis system, the sample being obtained from the headspace of a vial or vessel wherein the sample is in solid or liquid form, such method consisting in introducing a pressurized inert gas in the headspace through a feed duct provided with control means to control the pressure or flow, and subsequently in discharging the pressure from the headspace through a loop or chamber having constant volume and through a discharge duct provided with a valve, the discharge duct branching with respect to the feed duct, characterized in that during the pressure discharging step the feed duct is kept open and the pressure in the loop or chamber is controlled by means detecting the pressure in the feed duct and/or in the discharge duct.

Additional aspects of the invention appear in the description and claims.

The invention will now be described with reference to the attached drawings depicting different embodiments thereof, the drawings being purely provided by way of example and not limitation.

BRIEF DESCRIPTION OF THE DRAWINGS

The disclosure is best understood from the following detailed description when read in conjunction with the accompanying drawings. It is emphasized that, according to common practice, the various features of the drawings are not necessarily to scale. On the contrary, the dimensions of the various features may be arbitrarily expanded or reduced for clarity. Like numerals denote like features throughout the specification and drawings.

DETAILED DESCRIPTION

Figure 1:
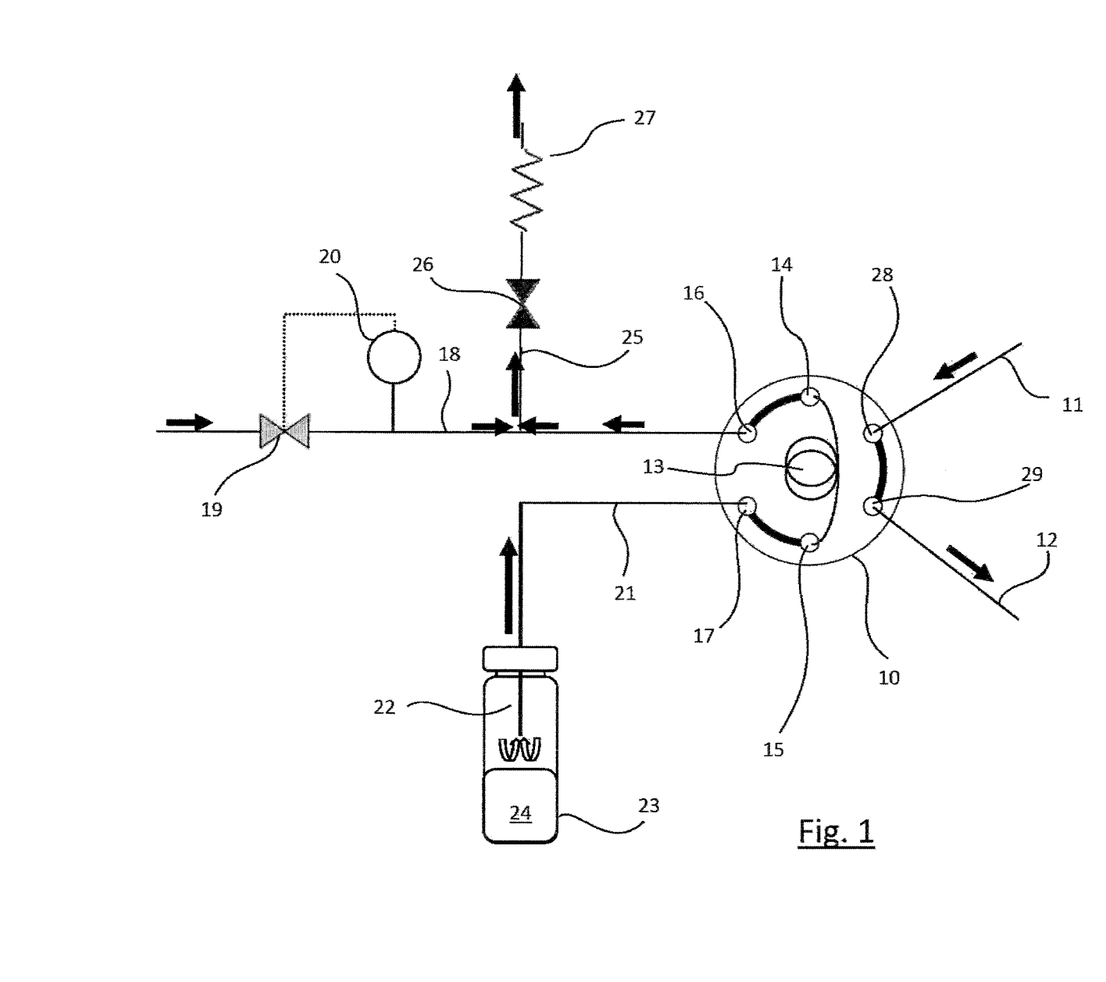
FIG. 1 is a scheme of the equipment that can be used for implementing the method according to the invention.

First, with reference to FIG. 1, the scheme depicted therein comprises, in a known way, a 6-way sampling valve 10 to which a feed duct 11 feeding a carrier gas and a duct 12 for delivering the carrier gas to the gas chromatographic column together with the sample, are headed to. The valve 10 also comprises a so-called loop 13 with a predetermined volume, which is heading to two openings 14 and 15 of the valve itself. The two openings 14 and 15 are in turn respectively connected, inside the valve, to further two openings 16 and 17.

Figure 5:
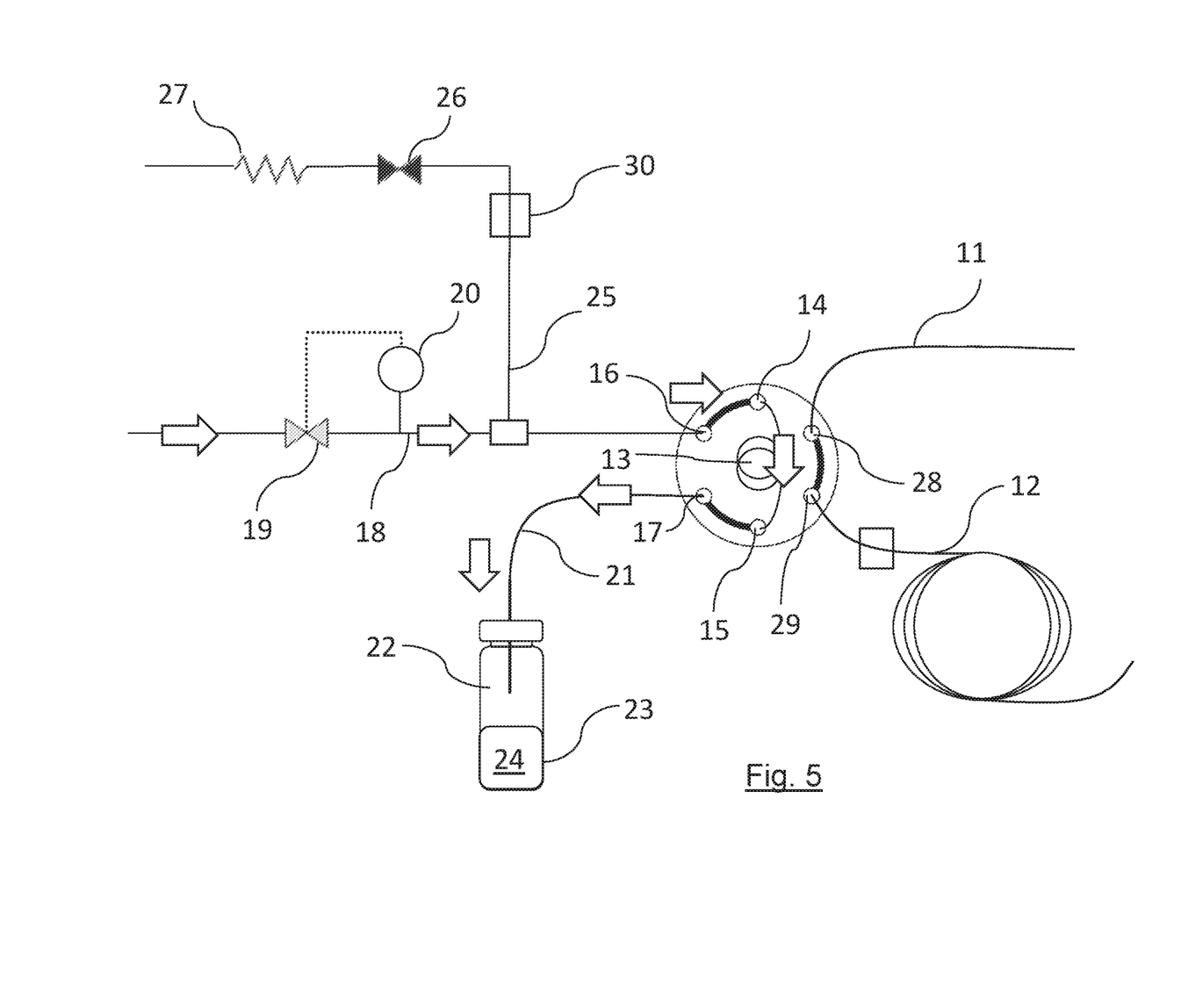
FIGS. 5 and 6 depict, with reference to the scheme of FIG. 1, the steps of transferring the sample in the loop according to the invention.

The opening 16 of the valve 10 is connected, in the depicted position, to a feed duct 18 of an inert gas operating under the control of a proportional valve 19 and a pressure sensor 20 (both arranged so that the valve is opened or closed to increase or decrease the pressure in the duct), which jointly allow to control the pressure of the inert gas fed from the duct 18 to the openings 16 and 14, to the loop 13 and from that to the openings 15 and 17, in order to pressurize as desired a duct 21 which is ending with a needle inserted, through a septum, in the headspace 22 of a vial 23 containing the sample 24 and tightly closed. This pressurizing operation of the vial 23 is depicted in FIG. 5, wherein the path of the inert gas is depicted.

In the known art, once ended pressurizing the vial 23, the auxiliary gas supply is closed and the pressure is discharged through a discharge duct 25, the discharge duct branching from the duct 18, downstream of the proportional valve 19 and the pressure sensor 20. The duct 25 is equipped with an opening and closing on/off valve 26 and with a flow limiter 27 and it remains open until obtaining the filling of the loop 13 with the sample coming from the vial 23, by the duct 21, the openings 17 and 15, the loop 13, the openings 14 and 16 and the length of duct 18 until the duct 25 is branching. When the loop 13 is filled with the desired amount of sample, i.e. at the desired pressure, the 6-way valve 10 is rotated until the openings 17 and 16 are corresponding to the openings 28 and 29 of the valve itself, in order to feed the sample to the gas chromatographic system by the carrier gas.

However, the known art depicted above has the drawbacks previously mentioned. To avoid such drawbacks the invention provides that during the pressure discharge the duct 18 of the inert gas remains open and the pressure is adjusted to the desired value, obviously lower than the previous one, by the sensor 20 and the proportional valve 19. In such a way it is possible to adjust the pressure in the loop 13 to the desired value and to guarantee that the amount of sample therein is exactly the desired one. Furthermore, using an on/off valve 26, as well as feeding inert gas diluting the sample in the discharge duct, reduces the chances of pollution of such a valve 26, which is also more robust than a proportional valve.

Figure 2:
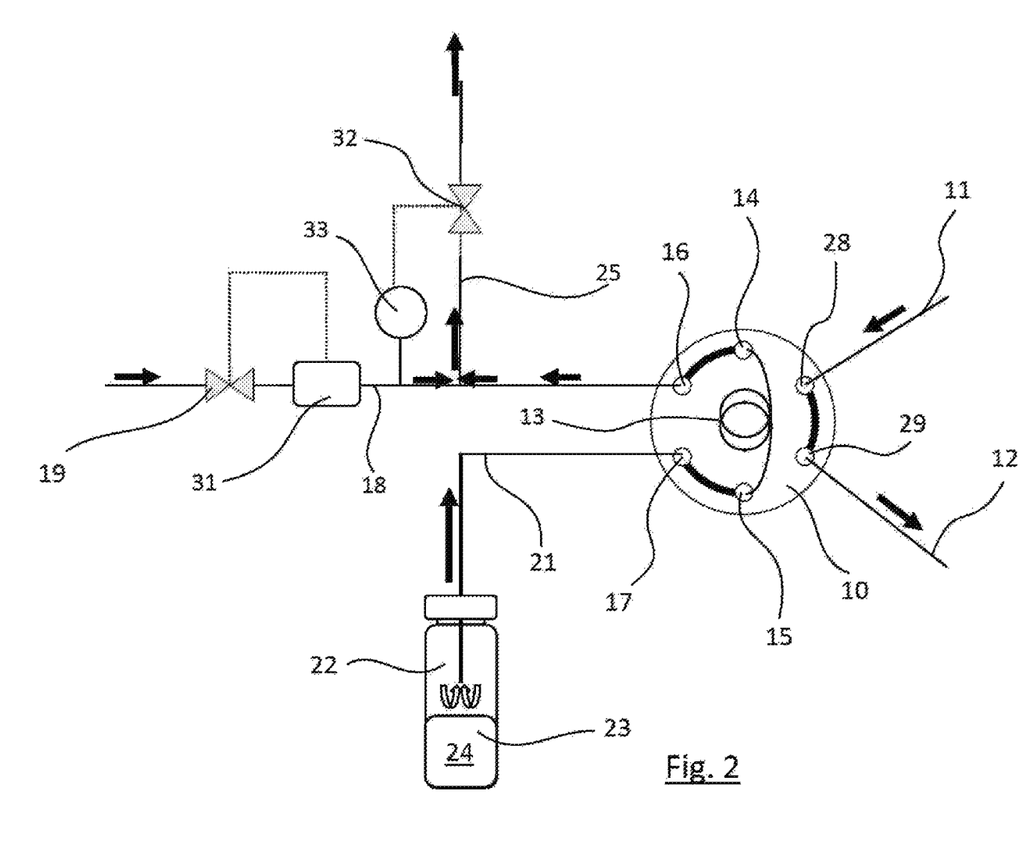
FIG. 2 is a scheme of an equipment according to a first variant, still for implementing the invention.
Figure 6:
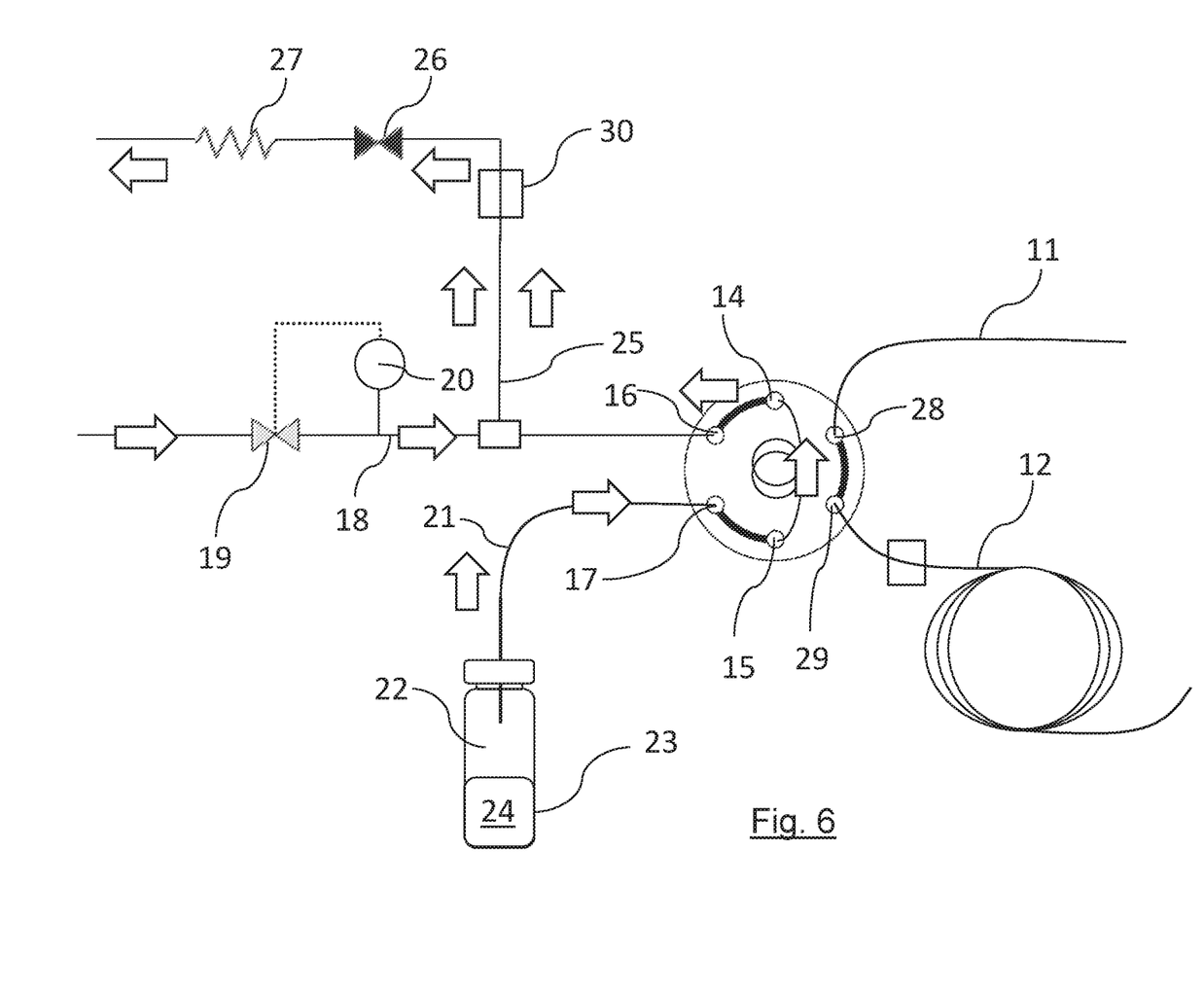

This step according to the invention is depicted in FIG. 6 reproducing the scheme of FIG. 1 with the addition of a coal trap 30 to further reduce the chances of pollution. FIG. 2 depicts an alternative scheme to that of FIG. 1, in which a flow sensor 31 on the duct 18 for controlling the proportional valve 19 is provided, whereas on the duct 25 is placed a proportional valve 32 controlled by a pressure sensor 33. The method for collecting the sample in the loop is the same as that seen above.

Figure 3:
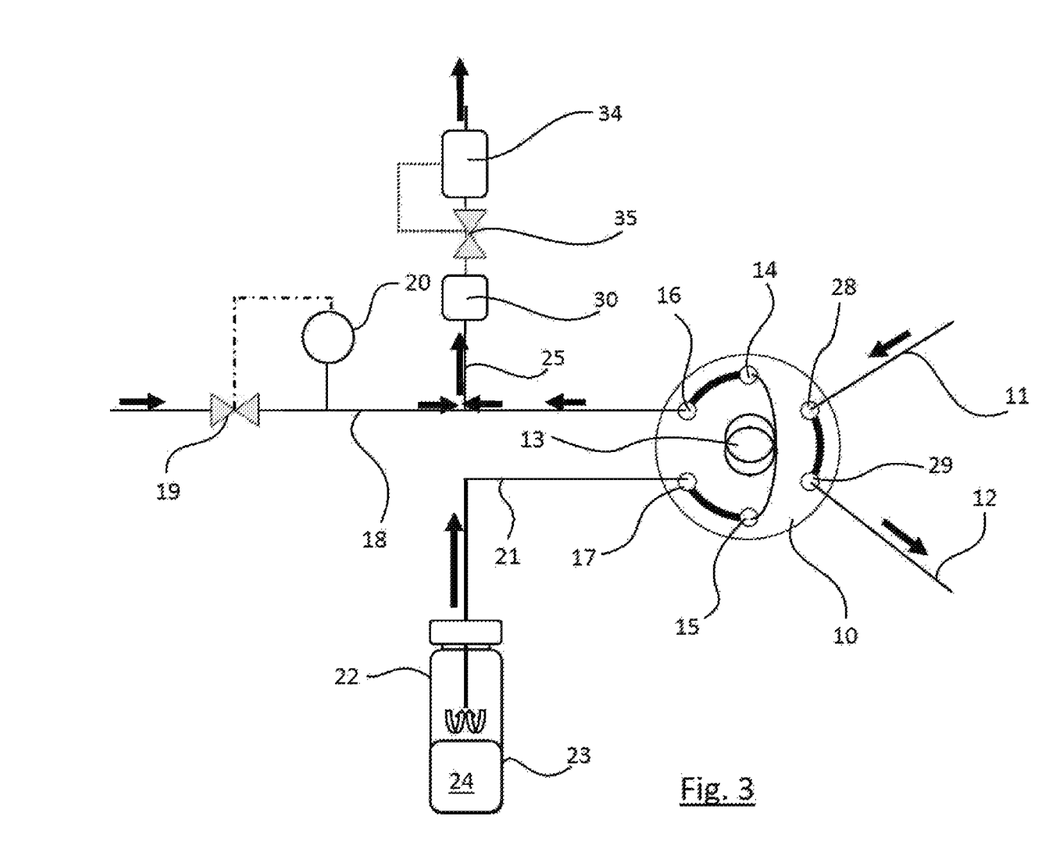
FIG. 3 is a scheme of a second variant of equipment for implementing the method according to the invention.

In FIG. 3, the variants with respect to the scheme of FIG. 1 consist in providing the trap 30 along the discharge duct and controlling the discharge by a flow sensor 34 and a proportional valve 35. As it will be seen beyond, this architecture allows the discharge flow to be adjusted, especially to avoid condensation problems of the sample, or better of the solvent thereof, during the discharge step.

Figure 4:
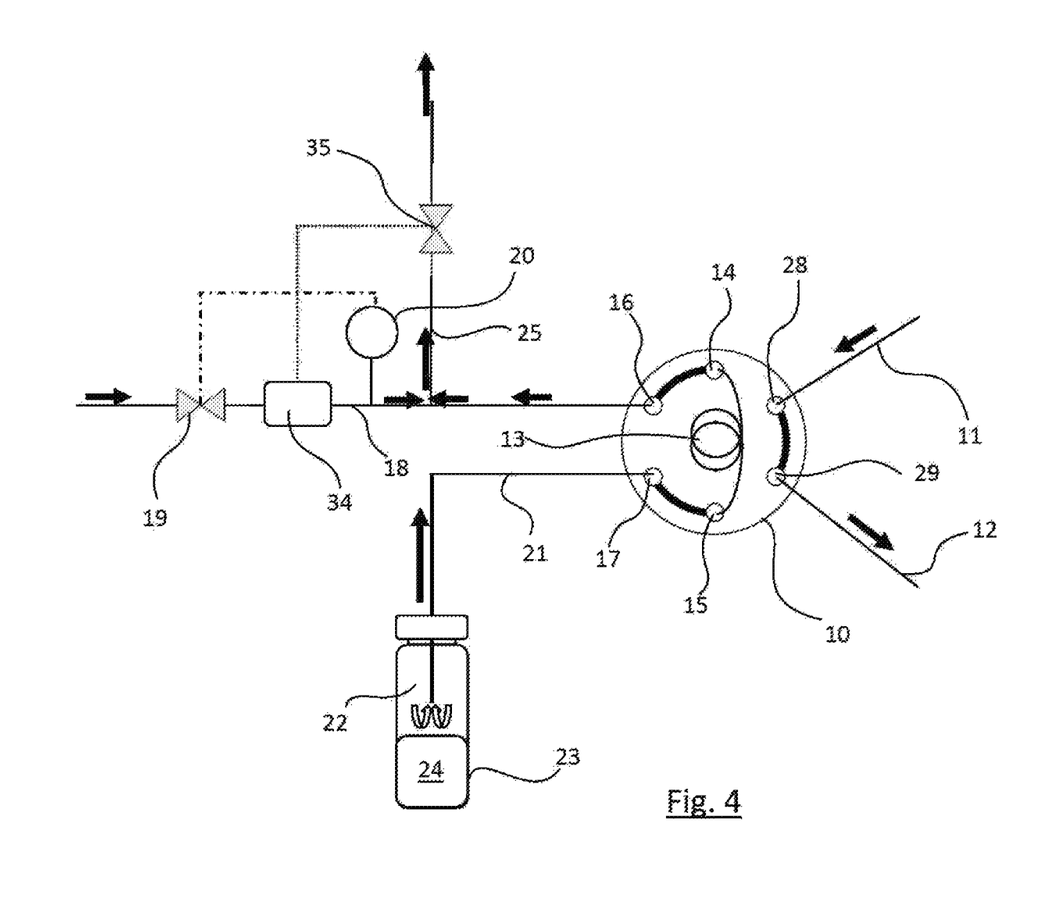
FIG. 4 is a scheme of a third variant.

Also the scheme of FIG. 4 allows controlling at best the flow during the discharge by using a flow sensor, placed on the duct 18, which controls the proportional valve 35. In particular, with reference to the scheme of FIG. 1, it can be noted that the same pressure controller 19, 20 is used to control both the pressure in the vial 23 during the pressurizing step thereof and the pressure in the loop 13 when depressurizing the vial. While depressurizing, the feed line 18 of the inert gas is still kept open feeding the gas, according to the invention, together with the sample, to the discharge line 25. This allows precisely adjusting the pressure downstream the loop 13 and, differently from the known art, in case the pressure in the loop 13 falls below the desired value during the adjustment of the discharge, it is still possible to restore it by the controller 19, 20 on the line 18. Another advantage of the configuration of FIG. 1 derives by the fact that it provides the use of the on/off valve 26, typically more robust than the proportional valve, still maintaining the precision in adjusting the pressure downstream of the loop. Finally, the gas input line is always traveled by clean gas and it is never contaminated.

During the step of filling the loop, part of the headspace is transferred in the loop by opening the discharge valve (independently of being a proportional valve or an on/off valve). The part of sample exceeding the volume of the loop reaches the colder area of the discharge path (where the valve is placed), with the risk of condensation, especially of the solvent in the case of liquid samples. This problem is common to all the existing headspace systems, independently by how the pneumatic adjustment is made. The higher the concentration of the components reaching the discharge area, the higher the chance of condensation. Depending on the condensing solvent, the membranes of the valve can even get damaged. Furthermore, the sample itself can retrodiffuse in the loop, causing visible contamination during the subsequent analyses. Moreover, the partial obstruction of the discharge route, due to the condensation, can compromise the accuracy of the system.

This problem could be mitigated by placing a filter before the valve, however this would involve adding in the line a not desired volume. Another possible solution could be heating the discharge region, but that would involve using a valve resistant to high temperatures and thus more expensive.

The pneumatic system according to the invention has the advantage to reduce the risk of condensation through the dilution of the sample in the discharge line by pure gas. In fact, the step of filling the loop is carried out with a continuous flow of gas from the feed line to make the pressure set-point more stable, by diluting in this way the sample exceeding the volume of the loop.

The volume or flow of pure gas to be added to dilute the sampled gas, in order to avoid the solvent condensation in the discharge line, can also be estimated.

Given that, once the sampling temperature has been reached inside the vial, a saturation of the gas above the liquid (headspace) with the solvent/matrix vapors happens, the partial pressure of the matrix corresponds to its vapor pressure. Such a value can be calculated once the temperature and the nature of the matrix itself are known (for example by using the Antoine equation relating the vapor pressure to the temperature for a determined compound).

The emptying flow (flow of saturated vapors discharged from the vial during the filling of the loop) can in practice be estimated based on the free volume of the vial (volume of the headspace) and on the pressure decrease in the vial during the emptying.

By approximating to an ideal gas it can be obtained that the discharge flow is:

$$\text{Emptying flow} = V\text{vial} * (T\text{ref}/T\text{vial}) * (1/P\text{ref}) * (dP/dt)$$

Wherein Vvial is the free volume in the vial, Tref and Pref are the reference temperature and pressure for the volumetric flow, T vial is the temperature of the vial, dP is the variation of pressure in the vial and dt is the time needed for emptying the vial (dP/dt=average depressurizing speed), which are parameters available and/or controlled by the instrument.

To avoid that there is condensation of the vapors at the discharge temperature (normally done at ambient temperature), the discharged vapors have to be diluted until their dew temperature (saturation) has become lower than the discharge temperature (ambient). By generalizing it can be estimated that:

Flow of gas to be added=Emptying flow*[(saturation pressure at Vial $T$)/saturation pressure at ambient $T$)]

That is:

Flow of inert to be added=$V$vial*($T$ref/$T$vial)*(1/$P$ref)*($dP/dt$)*[(saturation pressure at Vial $T$)/saturation pressure at ambient $T$)].

Wherein both the saturation pressures can be calculated by the Antoine equation, once known the type of matrix (solvent) and the vial and discharge (ambient) temperatures. The preceding merely illustrates the principles of embodiments of the disclosure. It will thus be appreciated that those skilled in the art will be able to devise various arrangements which, although not explicitly described or shown herein, embody the principles of the invention and are included within its spirit and scope.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for preparing a sample to be introduced in a chromatographic analysis system, said sample being obtained from the headspace of a vial or vessel wherein said sample is in solid or liquid form, such method comprising:
   introducing, via a feed duct, a pressurized inert gas in said headspace to pressurize the headspace of the vial;
   discharging through a loop or a chamber having constant volume, said pressurized inert gas from the headspace to depressurize said headspace of said vial, so that through a discharge duct provided with a valve, part of the sample of the headspace is transferred in the loop or in the chamber and, in the discharge duct branching with respect to the feed duct, and during the discharging step, and while depressurizing the headspace of the vial, keeping the feed duct open feeding the pressurized inert gas together with the sample to the discharge line and controlling the pressure in said loop or chamber by detecting the pressure in said feed duct and/or in said discharge duct.

2. The method according to claim 1, wherein the feed and discharge pressures are determined by a pressure sensor and a respective proportional valve controlled by the latter that are both placed on the feed duct, and in that the discharging is carried out through an on/off valve and a flow limiter.

3. The method according to claim 2, wherein the flow limiter consists of a sized restriction.

4. The method according to claim 1, wherein the discharge pressure is controlled by a pressure sensor and a respective proportional valve that are both placed on the discharge duct.

5. The method according to claim 1, wherein the flow of inert gas through the feed duct and the discharge duct is controlled by a flow sensor and a respective proportional valve that are both placed on the feed duct.

6. The method according to claim 1, wherein the feed and discharge pressures are controlled by a pressure sensor and a respective proportional valve that are both placed on the feed duct, and in that the discharging is carried out through a flow sensor and a respective proportional valve.

7. The method according to claim 1, wherein a flow sensor is placed on the feed duct and the respective proportional valve is placed on the discharge duct.

8. The method according to claim 1, characterized by quantitatively controlling the flow of inert gas fed to the discharge duct, so that sample condensing along such discharge duct is avoided.

9. The method according to claim 8, wherein said quantitative control of the flow of inert gas fed to the discharge duct is carried out by a flow detector and a respective proportional valve both acting on the feed duct and/or the discharge duct.

* * * * *